(12) United States Patent
Schweighofer

(10) Patent No.: US 6,265,655 B1
(45) Date of Patent: Jul. 24, 2001

(54) SIGNAL-TRANSMITTING CONNECTION WITH PROTECTION AGAINST MAGNETIC FIELD INTERFERENCE

(75) Inventor: Peter Schweighofer, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/261,873

(22) Filed: Mar. 3, 1999

(30) Foreign Application Priority Data

Mar. 5, 1998 (DE) .............................................. 198 09 570

(51) Int. Cl.$^7$ ...................................................... H05K 9/00
(52) U.S. Cl. .................................................. 174/32; 174/33
(58) Field of Search ................................. 174/32, 27, 28, 174/36, 33

(56) References Cited

U.S. PATENT DOCUMENTS

| | | | |
|---|---|---|---|
| 4,734,696 | * 3/1988 | Rogers | 340/825 |
| 4,754,102 | * 6/1988 | Dzurak | 174/36 |
| 4,764,939 | * 8/1988 | Rogers | 375/37 |
| 4,837,405 | * 6/1989 | Bonjour et al. | 174/36 |
| 4,945,189 | * 7/1990 | Palmer | 174/32 |
| 5,033,091 | * 7/1991 | Bond | 381/94 |
| 5,523,528 | * 6/1996 | Bese et al. | 174/36 |
| 5,831,210 | * 11/1998 | Nugent | 174/27 |
| 5,965,956 | * 10/1999 | Bochme et al. | 307/91 |

FOREIGN PATENT DOCUMENTS 31 45039   10/1982   (DE) .

* cited by examiner

*Primary Examiner*—Dean A. Reichard
*Assistant Examiner*—William H. Mayo, III
(74) *Attorney, Agent, or Firm*—Schiff Hardin & Waite

(57) ABSTRACT

In a signaling connection having at least two electrical conductors which different connect components and/or subassemblies, a reliable signal transmission is insured by providing at least one additional electrical conductor, arranged such that voltages which are induced by magnetic interference fields are compensated, even given strong magnetic interference and independent of the arrangement of the electronic components or subassemblies.

5 Claims, 2 Drawing Sheets

SIGNAL-TRANSMITTING CONNECTION WITH PROTECTION AGAINST MAGNETIC FIELD INTERFERENCE

BACKGROUND OF THE INVENTION

1. Field of the Invention

The present invention relates to a signaling connection of the type formed by at least two electric conductors by; means of which different components and/or subassemblies can be connected.

2. Description of the Prior Art

A signaling connection of the above general type can serve to connect a TTL-IC to an opto-coupler via at least two electrical conductors, for example. Of the at least electrical conductors, one serves as a reference potential line, and the other electrical conductor or conductors serve as signal lines.

In a highly magnetically disturbed environment, e.g. given a proximate magnetic resonance device or proximate power transistors, such high voltages can be induced in the electrical conductors such that functional disturbances may arise which render a reliable signal transmission impossible.

In order to prevent this kind of magnetic interference, it is known to utilize coaxial cable for signal transmission. Coaxial cable, as is well-known, has concentrically arranged electrical conductors in which voltages arising from electrical interference fields are discharged as long as the electrical conductors do not form a closed loop (loop area equals zero). Thus, magnetic interference fields do not influence the signal-carrying electrical conductors.

It is also known to twist electrical conductors in pairs. This technique does not work as well as a coaxial line, however, and must therefore often be applied in combination with a precisely defined laying (i.e., path selection) of the twisted pair, which can result in corresponding added costs.

It is also known to provide filters in electrical cables and conductors, with not insignificant extra costs. The insertion of filters is often not possible, however, since the filters unavoidable influence, and may thus cause a falsification, of the transmitted signals.

German OS 31 45 039 teaches an integrated semiconductor circuit which is arranged on a substrate and which has a number of signal-carrying conductors runs on this substrate. In order to reduce the reciprocal electrical influence of a first signal-carrying conductors run, which transmits a first signal, and a second signal-carrying conductors run, which transmits a second signal, a third signal-carrying conductors run is arranged on the substrate. The third signal-carrying conductors run transmits a third signal whose phase is opposite the phase of the first signal. On the basis of the oppositely phased feeding of a signal into the third signal-carrying conductors run, electrical interference fields between the first and the second signal-carrying conductors runs are compensated by opposite electrical interference fields between the second and third signal-carrying conductors runs.

The layouts depicted in FIG. 3 and FIG. 5 of German OS 31 45 039 represent an expensive realization of twisted-pair conductors on the semiconductor level. The electrical influence of the second signal-carrying conductors run is reduced by the twisting of the third signal-carrying conductors run with the first signal-carrying conductors run. Outer magnetic disturbances are also compensated in small measure by the twisting.

In the variants depicted in FIG. 2 and FIG. 4 of German OS 31 45 039, the electrical fields of the first and second signal-carrying conductors runs are compensated, however, the magnetic interference is twice that in a layout according to FIG. 1 with only first and second signal-carrying conductors runs.

The compensation measures described in German OS 31 45 039 always presume that both the aforementioned first and second conductors runs conduct signals. If only one of these two conductors runs conducts a signal, then this compensation measure is not suitable.

SUMMARY OF THE INVENTION

An object of the present invention is to provide a signaling connection of the above-described type wherein a reliable and cost-effective signal transmission is insured, even in the presence of strong magnetic interference, and which is independent of the arrangement of the components subassemblies connected by the signaling connection.

The object is achieved in a signaling connection of the above type according to the invention wherein at least one additional electrical conductor is connected at both ends to one of the aforementioned two electrical conductors, such that voltages induced by magnetic interference fields are compensated.

The inventive connection of a third conductor to one of the other two conductors also achieves the object because any magnetic interference field which is emitted between the first two electrical conductors is compensated by a magnetic interference field which is emitted between one of these electrical conductors and the third electrical conductor.

At least two electrical conductors connect different components and/or subassemblies. The one additional electrical conductor is arranged such that voltages that are induced by magnetic interference fields are compensated.

The additional conductor or conductors is/are exposed to the same magnetic interference field as that which affects the electrical conductor or conductors which conduct a signal. The voltages induced by the magnetic interference field are thus cancelled out vectorially, thereby compensating the induced voltages (known as distant field compensation).

In the case of an external source of interference, the at least one additional conductor functions to suppress interference to the at least one electrical conductor which conducts a signal, rather than shielding against magnetic interference fields or a discharging a voltage arising from an electrical interference field. The inventive solution thus offers considerable cost advantages. Also, the signaling connection itself is not subjected to any limitations with respect to the laying of its electrical conductors.

In the case of a magnetic interference field produced within one of the components ir subassemblies which are connected by the signaling connection, any magnetic interference field which is emitted between the electrical conductors is inventively compensated by a magnetic interference field which is emitted between one of the electrical conductors and the additional electrical conductor.

Such interference sources in the connected components or subassemblies are, for example, components of power electronic circuits which are arranged on a neighboring motherboard and which interfere intensely, via their electrical conductors, with the signal transmission between the TTL-ICs and the opto-couplers, which are arranged together on another motherboard.

The inventive principle can be realized in nearly all types of signaling connections, for example, connections produced by ribbon cables, plug connectors or printed boards.

As used herein, "component" means electronic, electric and electromechanical components. Analogously, the term "subassembly" means electronic, electric, and electromechanical subassemblies. The term "electronically operating device" generally encompasses "components" and "subassemblies".

FIG, 3 shows a known ribbon cable in cross-section.

Figure 4:
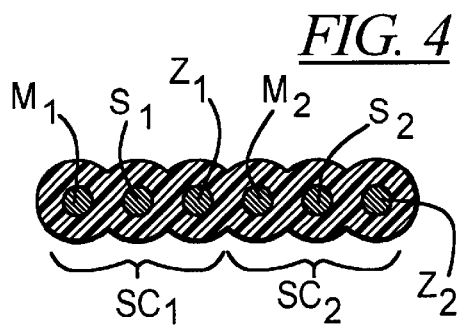
Figure 5:
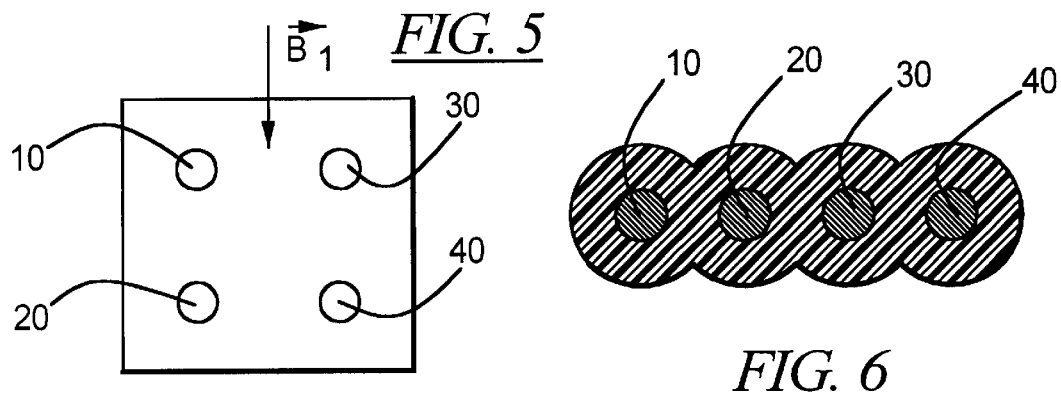

FIG. 4 shows a first embodiment of the inventive signaling connection employing a ribbon cable which is depicted in cross-section, FIG. 5 shows a pin configuration of a plug for a second embodiment of the inventive signaling connection with a plug being depicted in section.

Figure 6:
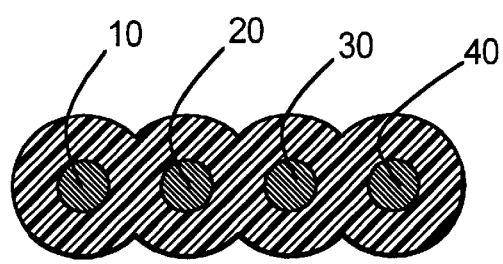

FIG. 6 hows a ribbon cable for the plug depicted in cross-section.

Figure 7:
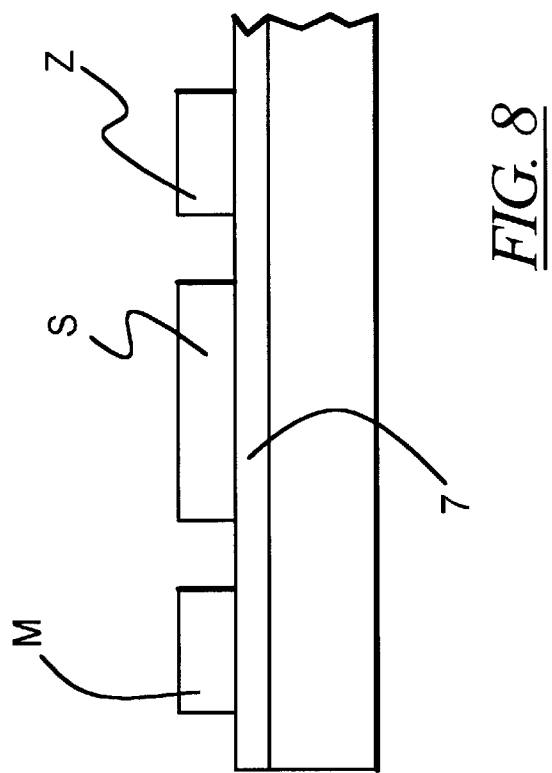

FIG. 7 shows a third embodiment of the inventive signaling connection employing a printed board which is depicted in section.

Figure 8:
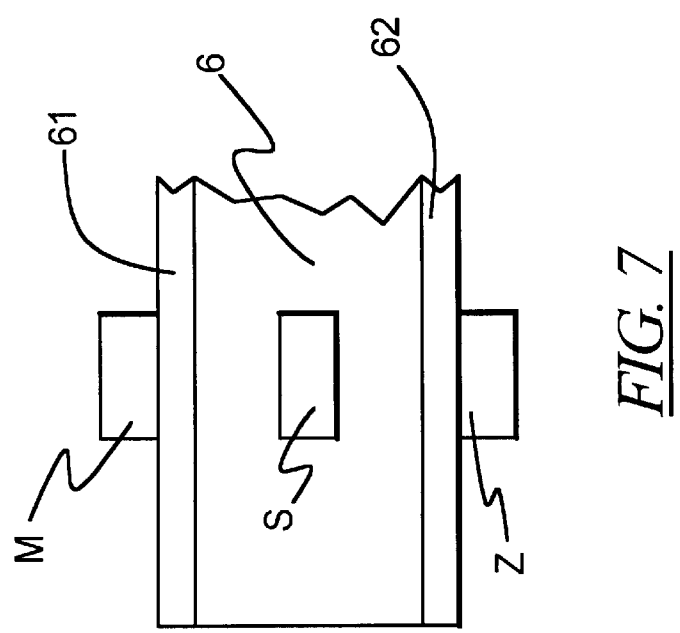

FIG. 8. shows a fourth embodiment of the inventive signaling connection employing another printed board which is depicted in section.

DESCRIPTION OF THE PREFERRED EMBODIMENTS

Figure 1:
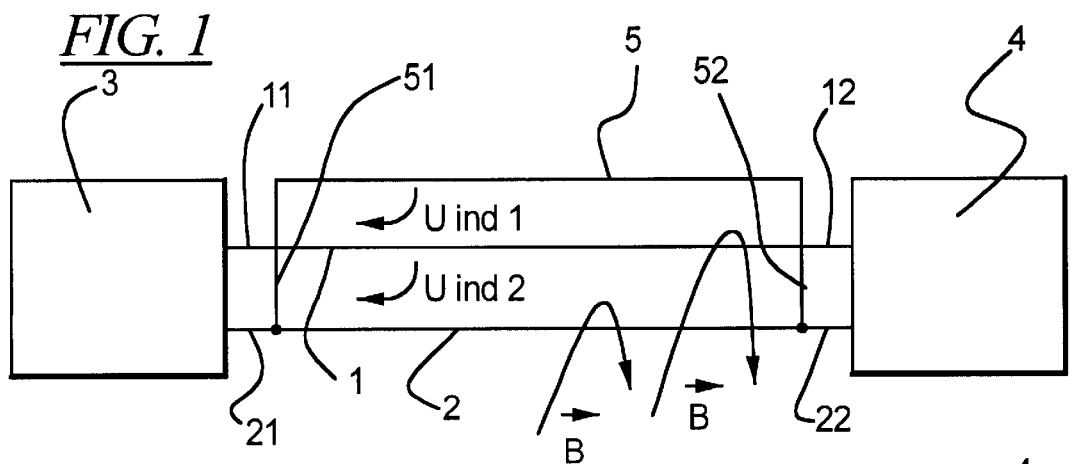
FIG. 1 is a schematic illustration of the functioning of an inventive signaling connection in the presence of a magnetic interference field produced by an external source.

Electrical conductors are referenced I and 2 in FIG. 1. The electrical conductor 1 is connected to a first component 3 (e.g. a TTL-IC) at its first end 11, and to a second component (e.g. an opto-coupler) at its second end 12. Analogously, the electrical conductor 2 is connected to the first component 3 at its first end 21 and to the second component 4 at its second end 22. An electrical signal is transmitted from the first component 3 to the second component 4 via the electrical conductor 1. The reference potential connection between the two components 3 and 4 is produced by the electrical conductor 2.

At least one additional electrical conductor is inventively arranged such that voltages which are induced by magnetic interference fields are compensated. For this purpose, in the exemplary embodiment depicted in FIG. 1, an additional electrical conductor 5 is connected to the first end 21 of the electrical cable 2 at its first end 51, and to the second end 22 of the electrical cable 2 at its second end 52.

The additional electrical conductor 5 is exposed to the same magnetic interference field B that affects the electrical conductor I which conducts a signal. By the connection of the ends 51 and 52 of the additional electrical conductor 5 to the ends 21 and 22 of the electrical conductor 2 which conducts a signal, the voltages $U_{ind1}$ and $U_{ind2}$ which are induced by the magnetic interference field B are compensated. The inventive principle also applies if the additional electrical conductor 5 is connected to the signal-carrying electrical conductor 1, however, in order to avoid or minimize capacitive interference, it is usually more advantageous to connect the additional electrical conductor 5 to the electrical conductor 2, which is at reference potential.

Figure 2:
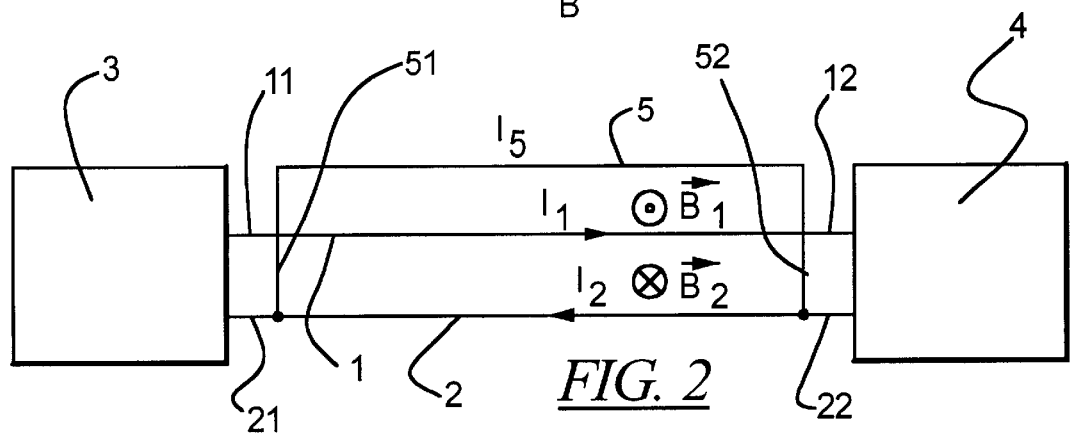
FIG. 2 is a schematic illustration of the functioning of the inventive signaling connection in the presence of a magnetic interference field produced by an external source.

Electrical conductors are again referenced 1 and 2 in FIG. 2. The electrical conductor 1 is connected to a first component 3 (e.g. an indirect capacitor) at its first end 11 and to a second component 4 (e.g. a semiconductor bridge) at its second end 12. Analogously, the electrical conductor 2 is connected to the first component 3 at its first end 21 and to the second component 4 with its second end 22. An electrical current $l_1$ flows from the first component 3 to the second component 4 via the electrical conductor 1. An electrical current $l_2$ flows from the second component 4 to the first component 3 through the electrical conductor 2. The electrical currents $l_1$ and $l_2$ respectively cause magnetic interference fields $B_1$ and $B_2$, which are opposite one another.

The magnetic interference field $B_2$ which is emitted between the electrical conductors 1 and 2 is inventively compensated by a magnetic interference field $B_1$. To this end, in the exemplary embodiment depicted in FIG. 2, an additional electrical conductor 5 is connected to the first end 21 of the electrical cable 2 with its first end 51 and to the second end 22 of the electrical cable 2 with its second end 52. In the schematic illustration of FIG. 2, an electrical current $l_5$ flows in the additional electrical conductor 5 from the second component 4 to the first component 3, with $l_1=l_2+l_5$.

magnetic interference field $B_1$ which acts counter to the magnetic interference field $B_2$ is produced between the electrical conductor 1 and the additional electrical conductor 5 by the additional electrical conductor 5. The magnetic interference fields are thereby cancelled vectorially (vector sum is zero), thus compensating the magnetic interference fields $B_1$ and $B_2$.

Figure 3:
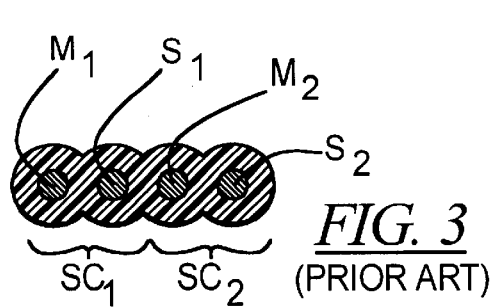

A known ribbon cable, which is depicted in FIG. 3, has two electrical cables $S_1$ and $S_2$ which conduct signals as well as two electrical conductors $M_1$ and $M_2$ which are at reference potential. The two electrical conductors $S_1$ and $M_1$, form a signaling connection $SC_1$ and the two electrical conductors $S_2$ and $M_2$ form a signaling connection $SC_2$. In order to achieve an interference compensation, the two signaling connections $SC_1$ and $SC_2$ are respectively expanded in accordance with the invention by additional electrical conductors $Z_1$ and $Z_2$, respectively. Thus, according to the inventive structure shown in FIG. 4, the signaling connection $SC_1$ consists of the electrical conductor $S_1$, which conducts a signal, and the two electrical conductors $M_1$ and $Z_1$, which are at reference potential. Analogously, the signaling connection $SC_2$ comprises the electrical conductor $S_2$, which conducts a signal, and the two electrical conductors $M_2$ and $Z_2$, which are at reference potential. In the exemplary embodiment, the two signaling connections $SC_1$ and $SC_2$ respectively constitute a single-plane arrangement with equidistantly arranged electrical conductors.

An additional interference compensation can also be easily achieved inside a plug connector (e.g. in cut-clamp technology) with another additional electrical conductor, as is described below with the aid of FIGS. 5 and 6.

In FIGS. 5 and 6, electrical conductors are referenced 10 and 20 and 30 and 40, respectively. In the exemplary embodiment, the electrical conductors 10 and 40 are at reference potential, and the electrical conductors 20 and 30 transmit signals. In the plug embodiment depicted in FIG. 5, the electrical conductor pairs respectively occupy different planes.

The voltages induced between the electrical conductors 10 and 30 by the magnetic interference field B are cancelled out by the voltages which are induced between the electrical conductors 20 and 30 by the same magnetic interference field B. The same observation also applies to the voltages which are induced by magnetic interference field B between the electrical conductors 10 and 20, which are cancelled by the voltages induced between the electrical conductors 30 and 40.

The inventive solution is not limited only to signaling connections in which two electrical conductors per signal constitute a single-plane arrangement. The inventive measure can also be realized in plugs in which three electrical conductors form a single-plane arrangement (e.g. 96-pole DIN plug strips).

The inventive principle can also be realized in a printed board, not only between different layers, (FIG. 7) but also within a layer (FIG. 8).

The exemplary embodiment depicted in FIG. 7 is a multilayer printed circuit 6 with corresponding through-holes (not depicted in FIG. 7), the electrical conductor S which conducts a signal being arranged between an upper layer 61 and a lower layer 62. An electrical conductor M which is at reference potential is arranged on the upper layer 61. An additional electrical conductor Z, which likewise lies at reference potential, is arranged on the lower layer 62. The electrically conductive connection between the electrical conductor M and the electrical conductor Z proceeds via said through-holes in the multilayer. With respect to the compensation of the magnetic interference fields B, the description above applies The printed board depicted in FIG. 8 is a single layer printed circuit 7. An electrical conductor S which conducts a signal and an electrical conductor M which is at reference potential are arranged on the single layer 7. An additional electrical conductor Z is also provided. The additional electrical conductor Z is at reference potential in this case also. The three electrical conductors S, M and Z are arranged in one plane and equidistantly, and specifically such that the electrical conductor S which conducts a signal is situated between the two electrical conductors M and Z which are at reference potential.

In the exemplary embodiment depicted in FIG. 8, the interconnect width of the electrical conductor S is exactly as large as the interconnect width of the two electrical conductors M and Z together. The two electrical conductors M and Z usually have equal interconnect widths. Thus, the electrical conductors M and Z, each have an interconnect width which is half that of the electrical conductor S. Thus, in addition to the compensation of the magnetic interference fields B, capacitive couplings which are caused by electrical conductors extending on the back of the single layer 7 and/or by potential-carrying surfaces situated on the back of single layer 7 are also compensated.

Although modifications and changes may be suggested by those skilled in the art, it is the intention of the inventor to embody within the patent warranted hereon all changes and modifications as reasonably and properly come within the scope of his contribution to the art.

I claim as my Invention:

1. A signal-transmitting connection comprising:

a first electrically operating device and a second electrically operating device;

at least two electrical conductors electrically connected between said first and second electrically operating devices;

at least one additional electrical conductor having opposite ends connected, spaced from each other, to one of said at least two electrical conductors, and each of said at least two electrical conductors and said at least one additional electrical conductor being disposed equidistantly from each other.

2. A signaling connection as claimed in claim 1 wherein at least one of said first electrically operating device and said second electrically operating device contains a magnetic field-emitting component, said magnetic field-emitting component producing a magnetic interference field between said at least two electrical conductors which is compensated by a further magnetic interference field emitted between one of said at least two electrical conductors and said additional electrical conductor.

3. A signaling connection as claimed in claim 1 wherein each of said at least two electrical conductors and said at least one additional electrical conductors are disposed in a single plane.

4. A signaling connection as claimed in claim 1 wherein said one of said at least two electrical conductors to which said additional electrical conductors connected is at reference potential.

5. A signaling connection as claimed in claim 1 wherein said one of said at least two electrical conductors to which said at least one additional electrical conductors connected is a signal-carrying conductor.

* * * * *